C. F. FRANZWA.
SPATULATING DEVICE.
APPLICATION FILED APR. 6, 1921.
1,430,070.
Patented Sept. 26, 1922.
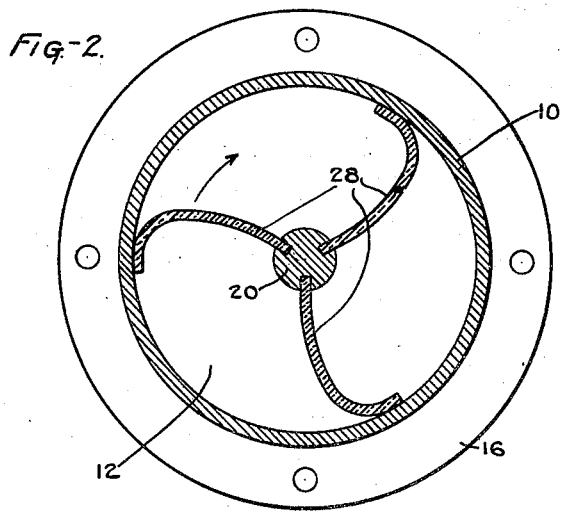
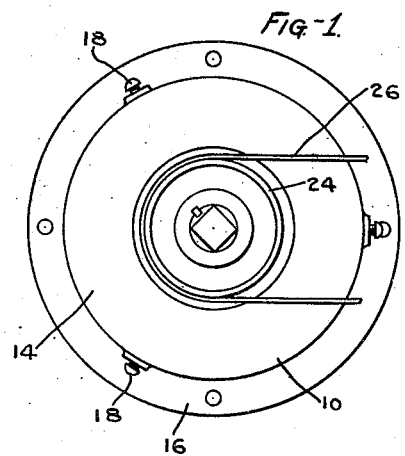
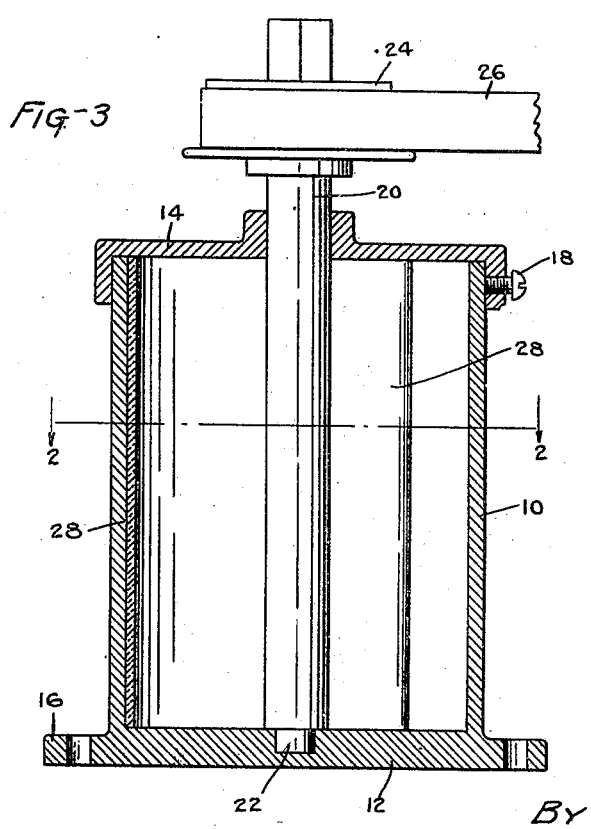
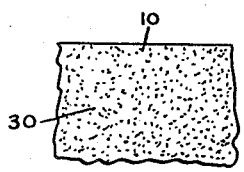
INVENTOR:
CHARLES F. FRANZWA.
BY Whiteley and Ruckman
ATTORNEYS.

Patented Sept. 26, 1922.

1,430,070

UNITED STATES PATENT OFFICE.

CHARLES F. FRANZWA, OF EAU CLAIRE, WISCONSIN.

SPATULATING DEVICE.

Application filed April 6, 1921. Serial No. 459,106.

*To all whom it may concern:*

Be it known that I, CHARLES F. FRANZWA, a citizen of the United States, residing at Eau Claire, in the county of Eau Claire and State of Wisconsin, have invented certain new and useful Improvements in Spatulating Devices, of which the following is a specification.

My invention relates to spatulating devices, and is intended particularly for spatulating a composition of plaster of Paris and silicate for use in making moulds in which dental castings are formed. Heretofore the usual practice has been to put the ingredients into a rubber bowl and spatulate them by rubbing them against the interior of the bowl by means of a spatula held in the hand of the operator. In practice this is a very tedious operation, since the spatulating action has to be continued for a considerable length of time in order to produce an intimate mixture having the desired creamy consistency. Furthermore a considerable degree of dexterity is required to perform this operation successfully by hand since a particular kind of stroke is necessary. An object of my invention, therefore, is to provide a device which will take the place of this hand spatulating and make it possible to quickly give the composition the requisite creamy consistency without the exercise of any particular skill. I am aware of the fact that prior to the time of my invention beaters and mixers have been constructed in which curved rigid blades were employed, but my experience has been that none of such devices can be used successfully for spatulating.

The full objects and advantages of my invention will be obvious from the foregoing description, and the novel features embodied in my inventive idea will be particularly pointed out in the claims.

In the accompanying drawings which illustrate one of the forms in which my invention may be embodied,—Fig. 1 is a top plan view of my device; Fig. 2 is a view in horizontal section on the line 2—2 of Fig. 3. Fig. 3 is a view substantially in vertical central section. Fig. 4 is a fragmentary view of a portion of the interior surface of the casing.

Referring to the construction shown in the drawings, the numeral 10 designates a receptacle preferably of metal and having a bottom 12 and a cover 14. If desired, the bottom may be provided with an outstanding flange 16 for securing the receptacle to a support and the cover may be provided with one or more set screws 18 for securing it to the receptacle. A vertical shaft 20 extends through a central opening in the cover and is stepped in the bottom at 22. The upper end of the shaft 20 is shown squared so that it may be provided either with an operating handle or with a pulley 24 adapted to be rotated from a suitable source of power by means of a belt 26. One or more blades 28, preferably three in number, are secured in suitable manner to the shaft 20. These plates are of comparatively soft flexible material such as india rubber and the width of the blades is sufficiently great so that the outer edges thereof turn backwardly against the inner surface of the receptacle so as to have a facial engagement therewith for producing a spatulating action when the shaft is rotated. As will be seen from Fig. 3, the length of the blades 28 is sufficiently great so that as the bottom edges engage the bottom of the receptacle and the top edges engage the cover, thereby preventing by-passing of the material being spatulated from one side of the blades to the other. In order to increase the spatulating action, the inner surface of the receptacle may be somewhat roughened as by means of etching as indicated at 30 in Fig. 4.

The operation and advantages of my invention will be obvious from the foregoing description. The composition which is to be spatulated is placed in the receptacle, the cover is applied and the shaft is rotated in order to carry the plates around inside of the receptacle. On account of the flexibility and width of the spatulating blades, they assume the position substantially as shown in Fig. 2 so that the outer portions of the blades have facial engagement with the interior surface of the receptacle on account of their inherent flexibility. The material, therefore, passes in a thin stream between the outer surface of the blades and the inner surface of the receptacle, the place of the material thus passing being taken by successive portions of the material in front of the advancing plates so that the operation of correct hand spatulating is closely simulated. When the desired creamy consistency of the composition has been obtained, the cover and the shaft carrying the blades are removed and the composition may be quickly taken out of the receptacle.

I claim:

1. A spatulating device comprising a receptacle having imperforate walls, a shaft rotatably supported in said receptacle, and soft flexible blades attached to said shaft, said blades having a width sufficient to cause their outer portions to facially engage the interior of said receptacle on account of their inherent flexibility.

2. A spatulating device comprising a receptacle having imperforate walls, a vertical shaft rotatably supported in said receptacle and soft flexible blades radially attached to said shaft, said blades having a width sufficient to cause their outer portions to facially engage the interior of said receptacle on account of their inherent flexibility.

3. A spatulating device comprising a receptacle having imperforate walls, a cover for said receptacle, a vertical shaft rotatably supported in said receptacle, and soft flexible blades attached to said shaft, said blades having a width sufficient to cause their outer portions to facially engage the interior of said receptacle on account of their inherent flexibility and said blades having a length sufficient to cause their upper and lower edges respectively to engage said cover and the bottom of said receptacle.

4. A spatulating device comprising a receptacle having imperforate walls provided with a roughened interior surface, a shaft rotatably supported in said receptacle and soft flexible blades attached to said shaft, said blades having a width sufficient to cause their outer portions to facially engage the interior of said receptacle on account of their inherent flexibility.

In testimony whereof I hereunto affix my signature.

CHARLES F. FRANZWA.